L.J.M<sup>c</sup>Cormick & W.R.Baker, Assignors to
C.H.M<sup>c</sup>Cormick & Bro.
No. 119,712.

Patented Oct. 10, 1871.

HARVESTER.

3 Sheets--Sheet 3.

119,712

UNITED STATES PATENT OFFICE.

LEANDER J. McCORMICK AND WILLIAM R. BAKER, OF CHICAGO, ILLINOIS, ASSIGNORS TO C. H. McCORMICK & BROTHER, OF SAME PLACE.

IMPROVEMENT IN HARVESTERS.

Specification forming part of Letters Patent No. 119,712, dated October 10, 1871.

*To all whom it may concern:*

Be it known that we, LEANDER J. MCCORMICK and WILLIAM R. BAKER, both of Chicago, in the county of Cook and State of Illinois, have invented certain new and useful Improvements in Harvesters, of which the following is a specification:

The object of the first part of our invention is to regulate the height above the ground at which the cutting apparatus is carried; and the improvement consists in raising and lowering the main frame bodily by means of a lever pivoted to the frame, a thrust-bar pivoted to the lever and acting directly upon the periphery of the driving-wheel, and a link or radius-bar pivoted to the frame and to the thrust-bar to guide the latter properly, substantially as hereinafter set forth. The improvement further consists in a novel device, hereinafter described, for raising and lowering the grain-wheel on the machine. The improvement further consists in mounting the shipping-lever, which throws the rake-driving mechanism into or out of gear, upon the sliding box which supports one end of the main axle, as hereinafter set forth.

The improvements herein claimed will best be understood by reference to the accompanying drawing, which shows a machine embodying all our improvements, and in which—

Figure 1:
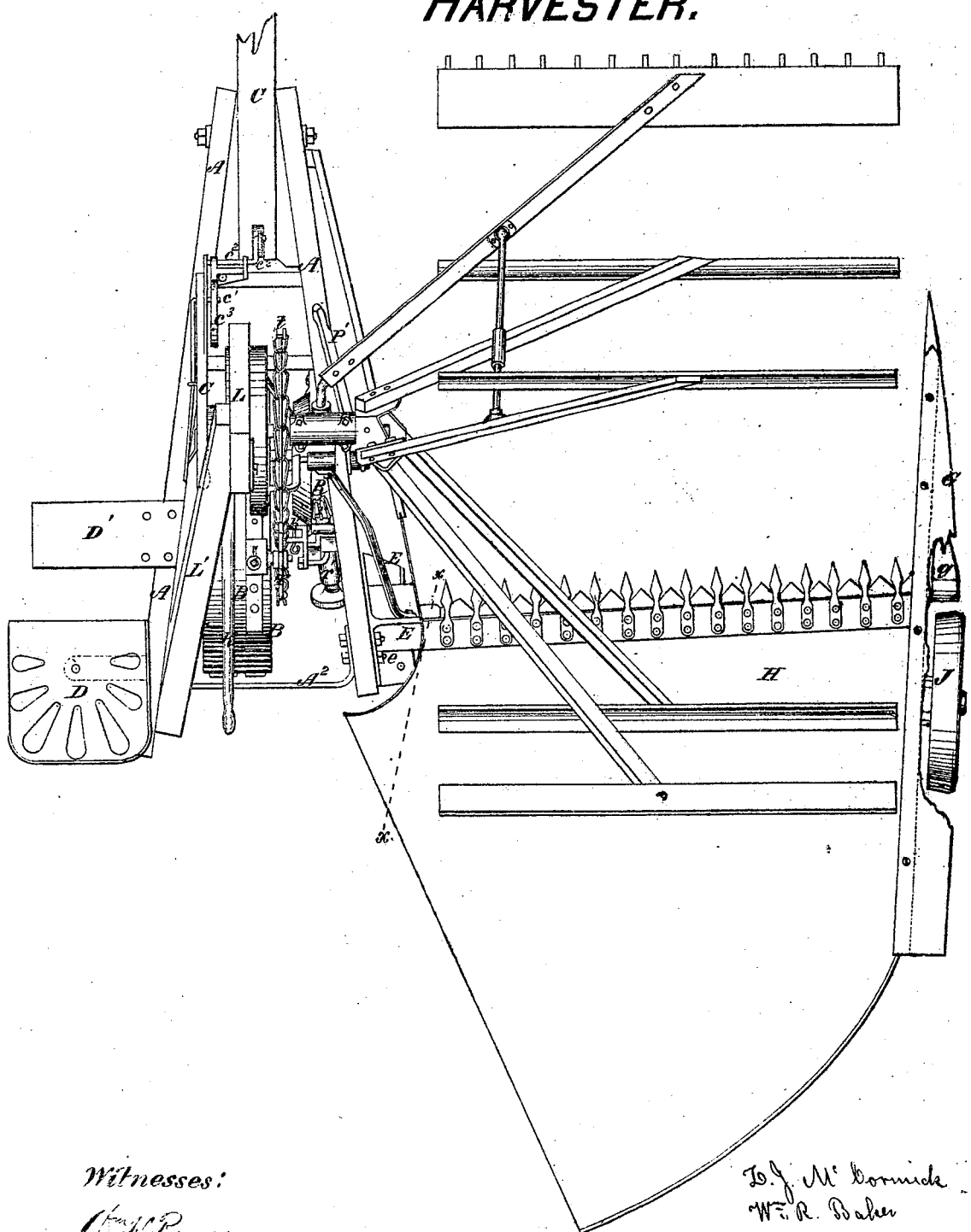
Figure 2:
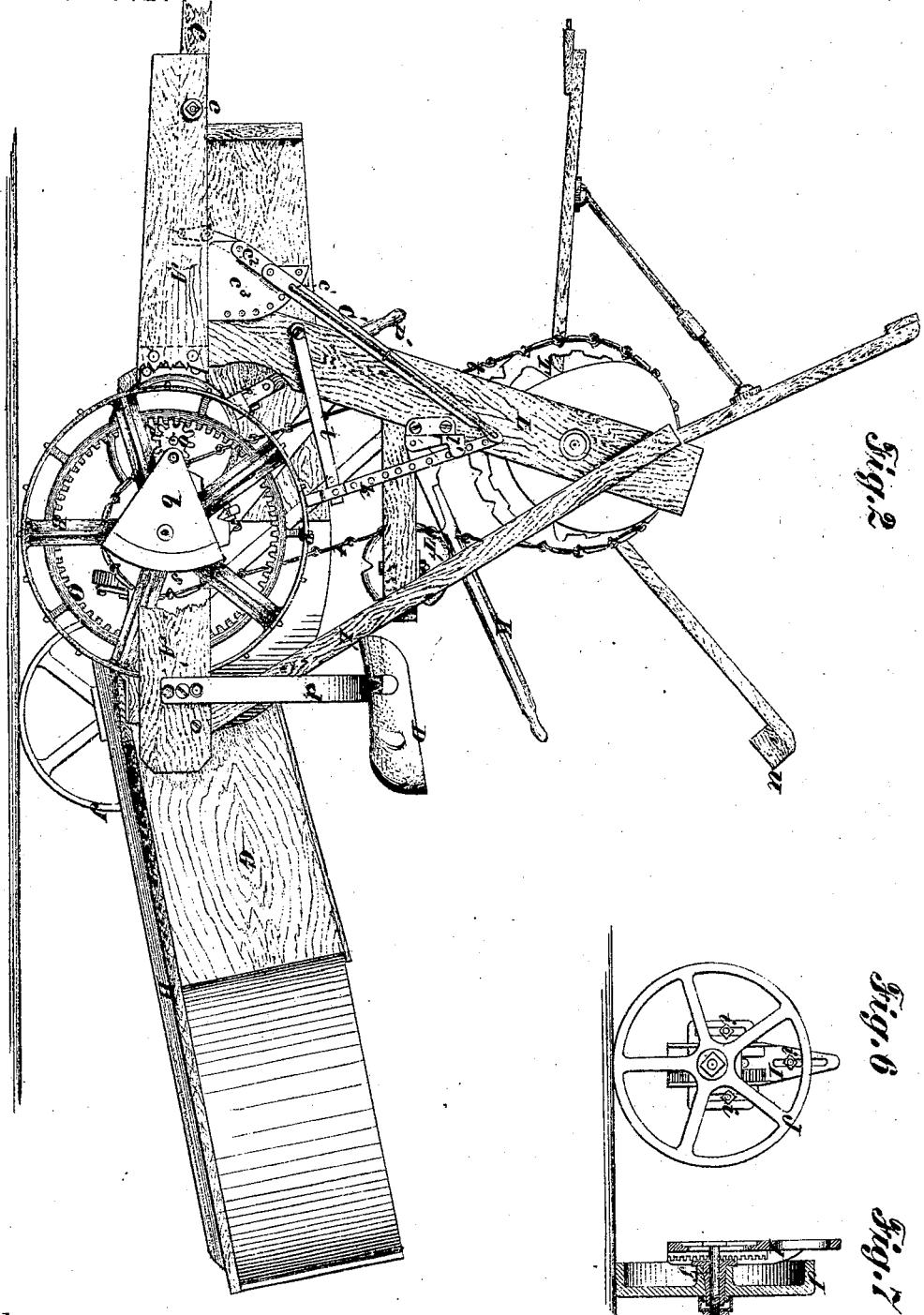
Figure 3:
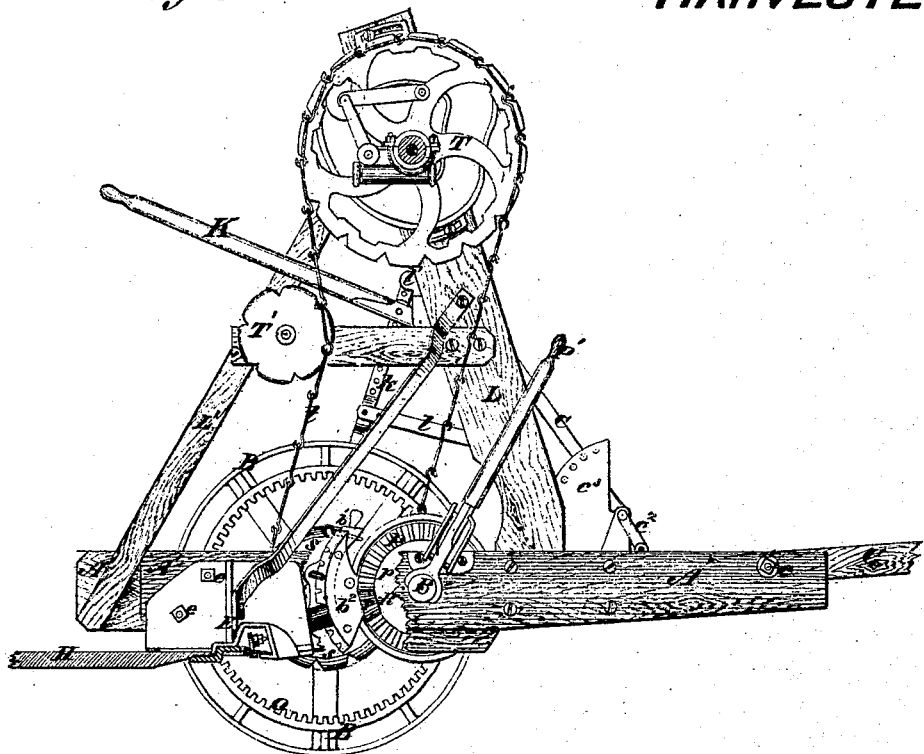
Figure 4:
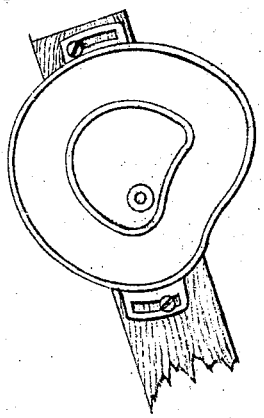
Figure 5:
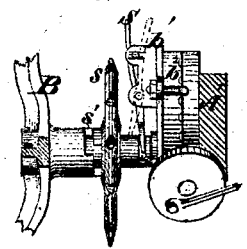

Figure 1 is a plan. Fig. 2 is an elevation of the stubble side, with a portion of the frame broken away; Fig. 3, a similar view of the grain side, with the platform in section, through the line $x$ $x$ of Fig. 1, and the rake and reel removed. Fig. 4 is a face view of the cam-guide. Fig. 5 is a rear elevation, on an enlarged scale, of a portion of the main driving-wheel, its axle, and the mechanism connected therewith detached. Fig. 6 is a side elevation of the grain-wheel and its supporting and adjusting mechanism, and Fig. 7 a vertical central transverse section through the same.

The general construction of the machine hereinafter described is similar to that patented by McCormick, Erpelding, and Baker, June 14, 1870.

The frame, in this instance, is composed of two longitudinal side timbers, A A¹, diverging slightly from front to rear, and connected at their back ends by a bar, A², of metal, (by preference of iron,) half an inch thick by seven inches in depth, set up edgewise, and having its ends bent inward, as shown in Fig. 1, to conform to the inclination of the side timbers, to which it is firmly secured. The frame is supported by a driving-wheel, B, the axle of which is mounted in bearings adjustable in the arc of a circle around the counter-shaft. This we do, by preference, by mounting the stubble end of the main axle in a radius-bar or sector-plate, $b$, Fig. 2, which is pivoted to the counter-shaft P or a joint coincident therewith. The grain end of the axle, in like manner, is mounted in a slide-box, $b^1$, moving on a fixed guide or sector-plate, $b^2$, Fig. 3, curved in an arc of which the counter-shaft forms the center. The axle is fixed at any desired elevation by means of pins or detents taking into notches on the sector-plates, as shown in Fig. 3. A lever, K, is pivoted on the main frame or to a post, L, extending above the frame. This lever is hinged to a thrust-bar, $k$, which acts directly upon the periphery of the driving-wheel, as shown in Figs. 1, 2, and 3. In order properly to guide the movements of the thrust-bar it is pivoted to one end of a radius-bar, $l$, the outer end of which is pivoted to the post L, thus producing a sort of parallel motion of the lever, thrust-bar, and link. To raise the machine the locking-bolts of the sectors $b$ $b^2$, hereinbefore described, are loosened; the attendant then raises the lever K and passes a pin through the thrust-bar $k$ below it; the lever K is then depressed and the frame raised upon the driving-wheel, the thrust-bar serving as a fulcrum for the lever. A guide, $l'$, on the post L keeps the thrust-bar in place. The machine is then fixed in its elevated position by tightening the bolts on the sector-plates. Instead of a pin, a ratchet might be formed on the thrust-bar $k$, and a spring-pawl be hung on the lever K to take into the ratchet. It is obvious that the link $l$ could be omitted, and that the frame could then be raised by the lever and thrust-bar alone; but the thrust-bar would then have to be guided by hand. A platform, H, may be secured to the finger-beam in any proper and well-known way. A socket-plate, I, is secured upon the grain side of the divider or platform by means of adjusting-bolts or screws $i$ passing through slots in the socket, by which means it may be set higher or lower and held in any desired position. (See Figs. 6 and 7.) A grain-wheel, J, turns loosely on an axle, $j$, mounted on a sliding block which moves vertically in guides in the socket-plate I. The sliding block and plate are corrugated, so as firmly to interlock when clamped together, which is done by screwing up the nut on the outer end of the axle. The axle may be set up or down by loosening the nut, moving the axle into the desired position, and then screwing it up again. The grain-wheel, preferably, is set at an acute angle to the line of draft, inclining from the tongue, (see Fig. 1,) as this arrangement enables the machine to turn more readily. An internally-geared spur-wheel, O, on the driving-wheel B, drives a spur-pinion, $o$, Fig. 2, on a counter-shaft, P, which carries a bevel-wheel, $p$, which drives a corresponding pinion, $r$, on a crank-shaft, R, which drives the cutters by a crank and pitman in the usual way. The box $r'$ of the crank-shaft is cast in one piece with the sector $b^2$, which serves as a guide for the main axle. The mechanism for driving the cutters is thrown into or out of gear by a shipping-lever, P', acting on suitable clutch mechanism on the counter-shaft. The mechanism for driving the rake is thrown into or out of gear by a shipping-lever, S, which moves a sprocket-wheel, $s$, endwise on the main driving-shaft, said wheel being driven from the driving-wheel by a clutch, $s'$. The lever S is mounted on the sliding box $b^1$ of the main axle, so as to conform to its adjustment.

We claim as our invention—

1. The combination of the driving-wheel, the main frame, the lever K, the thrust-bar acting directly on the periphery of the driving-wheel, and the pivoted guide-link $l$, all these parts being constructed for joint operation, substantially as hereinbefore set forth.

2. The combination of the adjustable slotted socket-plate I, the adjustable bearing of the grain-wheel, and the grain-wheel axle, all constructed and operating, as hereinbefore set forth, to adjust and hold the wheel by means of the nut on the axle.

3. The combination of the main frame, the driving-wheel, the sprocket-wheel on the main axle, the sliding box moving with the main axle, and the shipping-lever on the sliding box, as set forth.

In testimony whereof we have hereunto subscribed our names.

L. J. McCORMICK.
WM. R. BAKER.

Witnesses:
  C. A. SPRING, Jr.,
  JOHN N. A. HASBROOK. (47)